June 7, 1960
H. M. McCONNELL ET AL
2,940,033
CIRCUIT FOR SENSING THE HIGHEST PHASE
VOLTAGE OF A POLYPHASE ALTERNATING
CURRENT GENERATOR
Filed Sept. 10, 1956
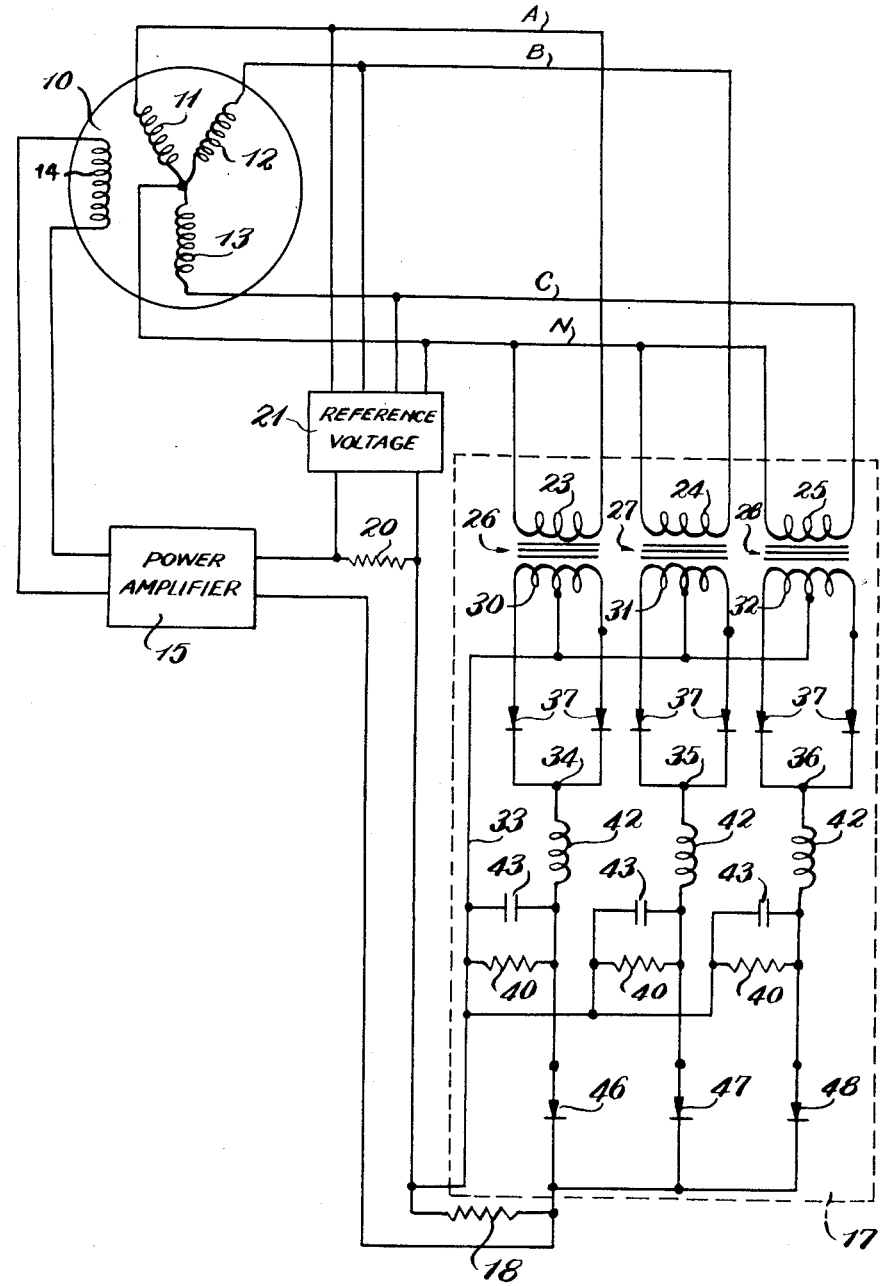
INVENTORS
HOWARD M. McCONNELL
BY RALPH J. LEPPLA
Frank W. Harmon
ATTORNEY

United States Patent Office 2,940,033
Patented June 7, 1960

2,940,033
CIRCUIT FOR SENSING THE HIGHEST PHASE VOLTAGE OF A POLYPHASE ALTERNATING CURRENT GENERATOR

Howard M. McConnell, Chagrin Falls, and Ralph J. Leppla, Maple Heights, Ohio, assignors to Jack & Heintz, Inc., Cleveland, Ohio, a corporation of Delaware Filed Sept. 10, 1956, Ser. No. 608,794

3 Claims. (Cl. 322—28)

The present invention relates to polyphase alternating current generating systems and more particularly to a method and apparatus for regulating the voltage of the system.

In aircraft generating systems, which are generally polyphase alternating current systems, it is desirable to have effective voltage regulating means which is of simple compact construction and which does not require the use of parts that call for frequent servicing. Many desirable ways of regulating voltages in polyphase systems are not used with aircraft because it is necessary to preamplify the signal from the voltage sensing circuit before using it to regulate the voltage of the system. Preamplification necessarily increases the size and complexity of the voltage regulating means and often involves the use of components which require relatively frequent servicing.

The principal object of the present invention is to provide a new and improved method of and apparatus for regulating the voltage of a polyphase alternating current generating system in which the voltage of the highest phase only is sensed and a signal provided which is utilized, without the necessity of preamplification, to control the generator or alternator for the system.

This new and improved circuit provides a signal to the amplification means in the voltage regulator whose power level can be adjusted by design to any desired value. Thus, the function of sensing and preamplification are accomplished in one device without the use of extra preamplifying circuits.

Further objects and advantages of the present invention will be apparent from the following detailed description of the preferred embodiment made with reference to the accompanying drawing forming a part of this specification, and in which the sole figure is an electrical diagrammatic showing of a circuit embodying the present invention.

The present invention contemplates the provision of regulating means for a polyphase alternating current generator which senses the highest phase voltage of the generator and provides a signal which is applied without preamplification to the power amplifier, for controlling the energization of the field coil of the generator for the system, the sensing means being capable of producing a signal which does not need preamplification before being applied to the power amplifier.

Referring to the drawing, a three phase generator 10 has phase windings 11, 12, 13, which are Y-connected in the illustrated embodiment, and a field winding 14. The field winding 14 is energized by a power amplifier 15. The output of the power amplifier 15, and in turn the voltage of the generator 10 is controlled by a circuit 17 which provides an output voltage signal across a resistor 18, which signal is compared wtih a reference voltage appearing across a resistor 20 connected in series with the resistor 18 in the input circuit to the power amplifier 15. The reference voltage across the resistor 20 is provided by a reference voltage circuit 21 connected to the load terminals of the generator 10. The power amplifier 15 and the reference voltage circuit 21 as well as the method of controlling the output of the power amplifier by comparing a signal dependent on the output of the generator with a reference voltage are well known to those skilled in the art, and, therefore, have been shown schematically and only briefly described.

According to the present invention, the signal voltage across the resistance 18 from the circuit 17 is dependent upon the highest phase voltage of the phases A, B, C of the generator 10 and is of sufficient power capability that it needs no preamplification before being applied to the input of the power amplifier. To sense the highest phase voltage, the primaries 23, 24, 25 of voltage transformers 26, 27, 28, respectively, are connected between the phases A, B, C, respectively, and the neutral connection N of the generator. The transformers 26, 27, 28 have center-tapped secondary coils 30, 31, 32, respectively, with the center taps of the secondary coils being connected to one side of the resistor 18 by a common lead 33. The transformers have respective junction points 34, 35, 36, to which the opposite ends of the respective secondary coils are connected through rectifying elements 37 which conduct current in a direction away from the adjacent end of the coil. The rectifying elements 37 provide full wave rectification for the voltage in the secondary coils and the rectified voltages of the secondary coils appear across corresponding resistors 40 connected between the junctions 34, 35, 36 and the common lead 33. Each of the resistors 40 is connected to the corresponding junction of the junctions 34, 35, 36 through an inductance 42 which forms part of a smoothing and filtering circuit for the rectified voltage of the corresponding secondary coil, the filtering circuit also comprising condensers 43 connected in parallel with the resistances 40.

The voltage across the three resistors 40 are dependent respectively on the voltages of the phases A, B, C, and the highest of the voltages developed across the resistors 40 is selected by a half wave multi-element selecting rectifier which passes only the highest of the voltages. The multi-element rectifier includes rectifying element 46, 47, 48 connected through the inductances 42 between the junctions 34, 35, 36, respectively, and the side of the resistance 18 opposite to the connection of the lead 33. The rectifying elements 46, 47, 48 conduct current so as to apply voltages in the same direction across the resistor 18, and, therefore, the highest voltage applied will block conduction of the other rectifying elements and the voltage across resistance 18 will always be the highest rectified phase voltage. For example, if the voltage across the resistor 40 in the output of the secondary coil 30 is the highest of the voltages across the resistors 40 the voltage across the resistor 18 will be of a polarity and magnitude to block conduction of the rectifying elements 47, 48. The voltage across the resistor 18 will be, therefore, the same as the voltage drop across the output resistor 40 of the secondary coil 30.

It can now be seen that the signal voltage appearing across the resistor 18 is dependent on the highest phase voltage of the polyphase system. The power capability of the signal voltage is such that it may be compared with the reference voltage and used to regulate the generator 10 without preamplification of the signal voltage.

The preferred embodiment of the present invention has been described in considerable detail; it is to be understood, however, that it is our intention to cover all constructions, modifications and arrangements which fall within the ability of those skilled in the art and the scope of the appended claims.

We claim:
1. In a polyphase alternating current generating sys- tem, means for regulating the voltages of the system comprising a voltage transformer for each phase, said transformers having primary coils connected between the phase lines and a neutral connection and secondary coils, rectifying means connected to each secondary coil for rectifying the outputs of the transformers, the rectifying means for each secondary conducting in the same directions with respect to the secondary coils, a separate impedance corresponding to each transformer, circuit means connecting the rectifying means associated with each of said transformers to the corresponding separate impedances, and means for selecting only the highest of the voltages across said separate impedances and for regulating the voltage of the system in accordance with the highest voltage only.

2. In a polyphase alternating current generating system, means for regulating the voltages of the system comprising a voltage transformer for each phase, said transformers having primary coils connected between the phase lines and a neutral connection and secondary coils, rectifying means connected to each secondary coil for rectifying the outputs of the transformers, the rectifying means for each secondary conducting in the same directions with respect to the secondary coils, an impedance corresponding to each transformer, circuit means connecting the rectified output of said transformers to the respective impedances, an output impedance, and circuit means connecting each of the first said impedances in parallel with the output impedance with the voltage drop across the output impedance in the same direction, said circuit means including a rectifying element connected between each impedance and the output impedance and conducting in the direction of the voltage drop across the output impedance.

3. In a polyphase alternating current generating system, means for regulating the voltages of the system comprising a voltage transformer for each phase, said transformers having primary coils connected between the phase lines and a neutral connection and secondary coils, rectifying means connected to each secondary coil for rectifying the outputs of the transformers, the rectifying means for each secondary conducting in the same directions wtih respect to the secondary coils, an impedance corresponding to each transformer, circuit means connecting the rectified output of said transformers to the respective impedances, an output impedance, and circuit means connecting each of the first said impedances in parallel with the output impedance with the voltage drop across the output impedance in the same direction, said circuit means including a rectifying element connected between each impedance and the output impedance and conducting in the direction of the voltage drop across the output impedance, said secondary coils being center-tapped coils with the center taps of the coils being connected to one side of the output impedance by a common lead, and the rectifying means for rectifying the output of each coil is a full wave rectifier.

References Cited in the file of this patent

UNITED STATES PATENTS

| | | |
|---|---|---|
| 1,888,718 | Friedlander | Nov. 22, 1932 |
| 2,196,041 | Thompson | Apr. 2, 1940 |
| 2,393,043 | Harder | Jan. 15, 1946 |

FOREIGN PATENTS

| | | |
|---|---|---|
| 761,759 | France | Mar. 27, 1934 |